US012762017B2

(12) United States Patent
Talasila et al.

(10) Patent No.: US 12,762,017 B2
(45) Date of Patent: Oct. 13, 2026

(54) MANAGING A BOOT OF A DATA PROCESSING SYSTEM DURING UNRECOVERABLE BOOT EVENT

(71) Applicant: Dell Products L.P., Round Rock, TX (US)

(72) Inventors: Phanindra Bhargav Talasila, Georgetown, TX (US); Xiaomei Zhu Miller, Round Rock, TX (US); Adolfo Sandor Montero, Pflugerville, TX (US); Ibrahim Sayyed, Georgetown, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 19/085,678

(22) Filed: Mar. 20, 2025

(65) Prior Publication Data

US 2026/0288588 A1 Sep. 24, 2026

(51) Int. Cl.
*G06F 11/00* (2006.01)
*G06F 11/14* (2006.01)

(52) U.S. Cl.
CPC ........ *G06F 11/1417* (2013.01); *G06F 11/142* (2013.01); *G06F 11/1435* (2013.01)

(58) Field of Classification Search
CPC . G06F 11/1417; G06F 11/142; G06F 11/1435
USPC .............................................................. 713/2
See application file for complete search history.

(56) References Cited

U.S. PATENT DOCUMENTS 9,529,602 B1 12/2016 Swierk
10,853,204 B2 12/2020 Bisa et al.
11,340,990 B2 5/2022 Hsu et al.
12,498,912 B1 12/2025 Sundararaman
2007/0174689 A1 7/2007 Chen
2007/0226328 A1 9/2007 Kusama
2014/0101653 A1* 4/2014 Dharmadhikari ......... G06F 8/65 717/173
2017/0052854 A1* 2/2017 Yang ..................... G06F 9/4401

(Continued)

FOREIGN PATENT DOCUMENTS

CN 114553672 A 5/2022
CN 119105892 A 12/2024

OTHER PUBLICATIONS

"3.3 Solid State Drive (SSD) Sideband Communication". (n.d.) Microchip. Retrieved from <https://onlinedocs.microchip.com/oxy/GUID-0B93C9C3-5EE7-4FF2-B393-A18C25E98146-en-US-4/GUID-4569DC63-C678-4EEC-A190-2BB0A73EC575.html> on Mar. 19, 2025 (2 pages).

(Continued)

*Primary Examiner* — Jason B Bryan

(74) *Attorney, Agent, or Firm* — WOMBLE BOND DICKINSON (US) LLP

(57) ABSTRACT

Methods and systems for managing operation of data processing system are disclosed. To manage the data processing system, a management controller of the data processing system may obtain and store a recovery image to a boot partition of a storage device hosted by the data processing system. When an unrecoverable boot failure is identified during a boot of the data processing system, the recovery image may be used during a new boot process initiated by a processor of the hardware resources to place the data processing system in desired operating state.

20 Claims, 7 Drawing Sheets

(56) References Cited

U.S. PATENT DOCUMENTS

| | | | |
|---|---|---|---|
| 2017/0207964 | A1 | 7/2017 | Ragupathi |
| 2018/0074884 | A1 | 3/2018 | Cady |
| 2018/0336086 | A1 | 11/2018 | Vaden |
| 2021/0240567 | A1 | 8/2021 | Hsu |
| 2021/0286692 | A1 | 9/2021 | Chien |
| 2022/0216916 | A1 | 7/2022 | Compann |
| 2022/0229482 | A1 | 7/2022 | Ba |
| 2022/0261322 | A1 | 8/2022 | Narasimhamurthy et al. |
| 2023/0025750 | A1 | 1/2023 | Teoh |
| 2024/0045765 | A1 | 2/2024 | Kim |
| 2024/0419552 | A1 | 12/2024 | Poosapalli |
| 2025/0068521 | A1 | 2/2025 | Choi |
| 2025/0068530 | A1 | 2/2025 | Montero |
| 2026/0030085 | A1 | 1/2026 | Kotary |
| 2026/0111315 | A1 | 4/2026 | Curtin |

OTHER PUBLICATIONS

Ham et al., "Low-overhead General-purpose Near-Data Processing in CXL Memory Expanders", arXiv:2404.19381v1, Apr. 30, 2024, retrieved from <https://arxiv.org/html/2404.19381v1> on Mar. 19, 2025 (16 pages).

Debendra Das Sharma and Thomas Coughlin, "Universal Chiplet Interconnect Express: An Open Industry Standard for Memory and Storage Applications", Computer. IEEE Computer Society, Jan. 2024, pp. 75-81, vol. 57, DOI: 10.1109/MC.2023.3318769. Retrieved from <https://www.computer.org/csdl/magazine/co/2024/01/10380290/1TpyLNc6Z7G> on Mar. 19, 2025 (7 pages).

"About Stolen Device Protection for iPhone". Apple Support. Dec. 11, 2024. Retrieved from <https://support.apple.com/en-us/120340> on Mar. 19, 2025 (3 pages).

* cited by examiner

MANAGING A BOOT OF A DATA PROCESSING SYSTEM DURING UNRECOVERABLE BOOT EVENT

FIELD

Embodiments disclosed herein relate generally to managing a data processing system. More particularly, embodiments disclosed herein relate to systems and methods for managing operation of data processing systems including sound systems using a management controller of the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
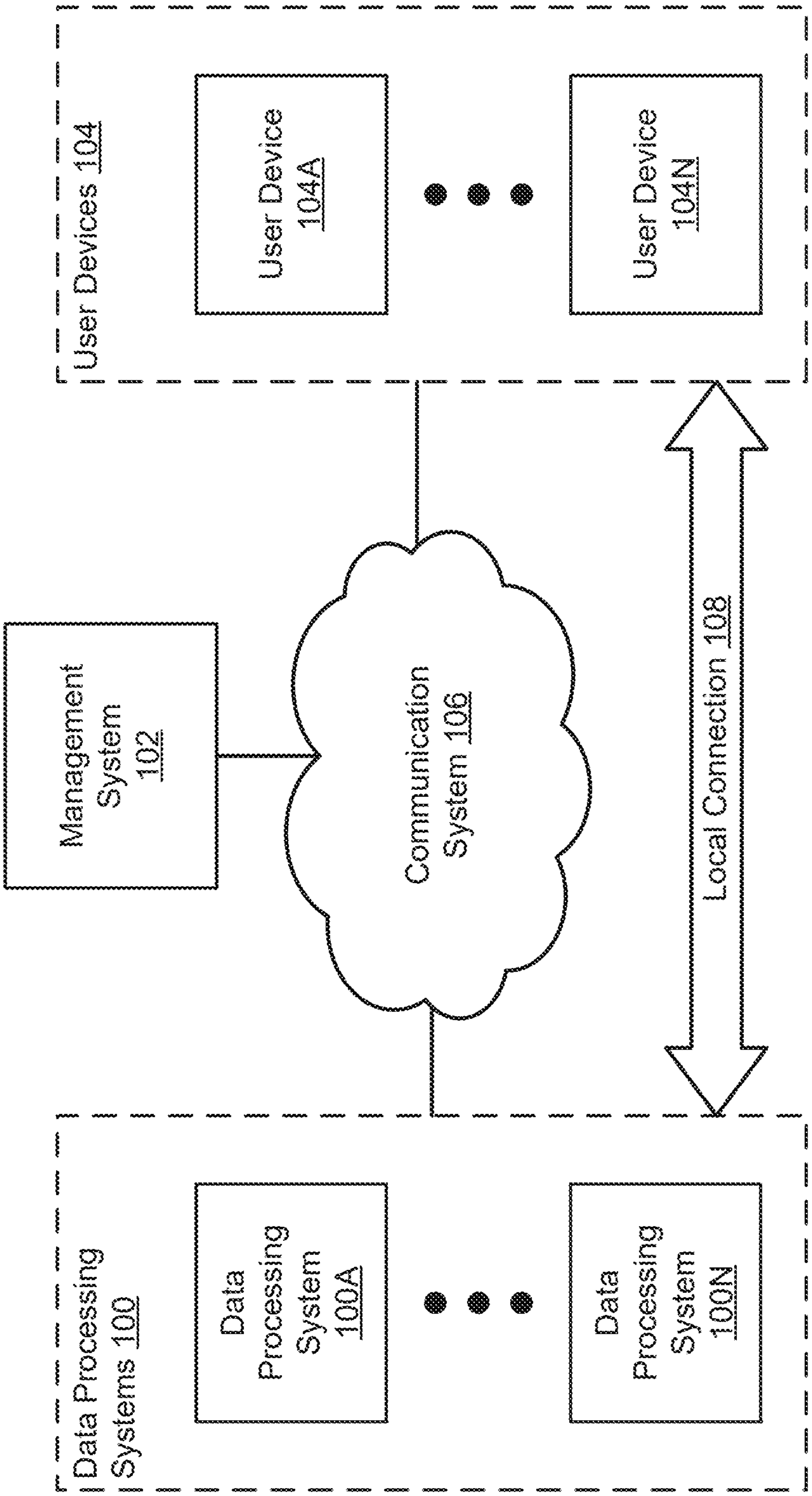
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing systems may provide computer-implemented services to any type and number of other devices and/or users of the data processing systems. The computer-implemented services may include any quantity and type of such services.

To provide the computer-implemented services, a data processing system may perform a booting process to initialize operation of hardware resources hosted by the data processing system. To do so, a processor (e.g., a central programming unit (CPU)) of the hardware resources may utilize boot data (e.g., basic input/output system (BIOS) firmware, system configuration files, etc.) that may be stored on a boot storage device. The boot storage device may include, for example, a non-volatile memory storage device (e.g., serial peripheral interface flash).

However, an unrecoverable boot failure may occur when the processor is unable to perform the booting process using a recovery image stored on the boot storage device and/or a (second) storage device. The storage device may include a non-volatile memory (NVMe) storage device that may include a boot partition (e.g., a section of the storage device allocated to store data relevant to the booting process). For example, the processor may be unable to perform the booting process when a copy of the recovery image hosted by the boot storage device and/or boot partition of the storage device includes erroneous data (e.g., corrupted firmware, malicious data, incompatible firmware version, etc.), a firmware image is improperly flashed on the boot storage device, and/or any other causes impacting an ability of the processor to perform the booting process. Consequently, at least a portion of the hardware resources may be inoperable.

To modify operation of the data processing system in an event of compromise and/or reduced functionality of at least a portion of the hardware resources, the data processing system may host a management controller that may operate independently from the hardware resources and may be distinct from and adapted to manage the hardware resources. For example, the management controller may operate during the booting process and/or regardless of an outcome of the booting process performed by booting components (e.g., the boot storage device and/or the processor) of the hardware resources.

Thus, to improve a likelihood that the data processing system may successfully perform a booting process, the management controller may obtain a recovery image from a remote entity in the event that the processor is unable to perform the booting process using corrupted recovery image hosted by the boot storage device and/or the boot partition of the storage device. The recovery image include recovery files, configurations, etc. usable to boot the data processing system into a desired operating state (e.g., via the processor performing a successful boot of the data processing system).

To identify the occurrence of the unrecoverable boot failure, the management controller may monitor a boot status by obtaining information regarding the booting process from the processor using a side band communication channel. If all recovery images are unusable (e.g., corrupted, not stored within one of the storage devices, etc.), the management controller may obtain a copy of the recovery image from a remote entity using out-of-band communication methods and store the recovery image in a boot partition of a storage device hosted by hardware resources of the data processing system.

The management controller may provide and/or obtain (e.g., read and/or write) data from the boot partition using a second side band communication channel. For example, the management controller may store an updated copy of the recovery image to the boot partition of the storage device and/or perform any other actions.

Once obtained, the recovery image may be used by the processor of the hardware resources to subsequently initiate a new boot process to place the data processing system in a desired operating state (e.g., successfully perform a boot of the data processing system).

Thus, embodiments disclosed herein may provide an improved method for managing operation of a data processing system by using a management controller to obtain (e.g., from a remote entity) and store a recovery image in a boot partition of a storage device based on identifying that an unrecoverable boot failure has occurred. By doing so, a processor of the data processing system may be more likely to perform a successful booting process to provision desired computer-implemented services provided by the data processing system.

In an embodiment, a method for managing operation of a data processing system is provided. The method may include: identifying, by a management controller of the data processing system, an occurrence of an unrecoverable boot failure for the data processing system during a boot of the data processing system; based on the identifying: obtaining, by the management controller and from a remote entity via an out-of-band communication channel, a recovery image, the recovery image being usable to boot the data processing system into a desired operating state; storing, by the management controller and to a boot partition of a storage device hosted by hardware resources via a side band channel, the recovery image; initiating, by a processor of the hardware resources and using an in-band channel between the processor and the storage device, a new boot using the recovery image to place the data processing system in the desired operating state; and providing computer-implemented services while the data processing system is in the desired operating state.

The unrecoverable boot failure may be due to all images usable to complete the boot being corrupted.

The hardware resources may include a processor, a boot storage device, and the storage device, wherein the hardware resources are connected via at least one in-band channel.

The in-band channels may be used to provide the desired computer implemented services.

The management controller may be independently operational from the hardware resources while connected to the hardware resources via side-band channels during the boot of the data processing system.

Obtaining the recovery image may include: selectively powering, by the management controller, a network module; providing, by the management controller and via the network module, a request for the recovery image to a remote entity; and receiving, by the management controller and via the network module, the recovery image in response to the request.

The method may also include: prior to the storing of the recovery image: selectively powering, by the management controller and via a side band channel, the storage device to gain access to the boot partition, wherein a corrupt recovery image stored in the boot partition is identified while the storage device is selectively powered and other components of the hardware resources are depowered, the corrupt recovery image being unusable during the boot to place the data processing system in the desired operating state.

The method may also include: after identifying the occurrence of the unrecoverable boot failure and prior to obtaining the recovery image, selectively powering, by the management controller, the storage device, wherein the recovery image is stored in the boot partition while the storage device is selectively powered and other components of the hardware resources are depowered.

Storing the recovery image may include performing at least one action selected from a list of actions consisting of: removing a corrupted recovery image stored in the storage device; and adding the recovery image to the boot partition with metadata distinguishing the recovery image from the corrupted recovery image.

The method may also include: after identifying the occurrence of the unrecoverable boot failure and prior to obtaining the recovery image: providing, by the management controller and using a local communication channel, a request for the recovery image to a user device, the local communication channel being a direct communication link that allows transmission of information between the management controller and the user device without using any networks; and forwarding, by the user device, the request for the recovery image to the remote entity in order to obtain the recovery image for the data processing system.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 100 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time.

Figure 1B:
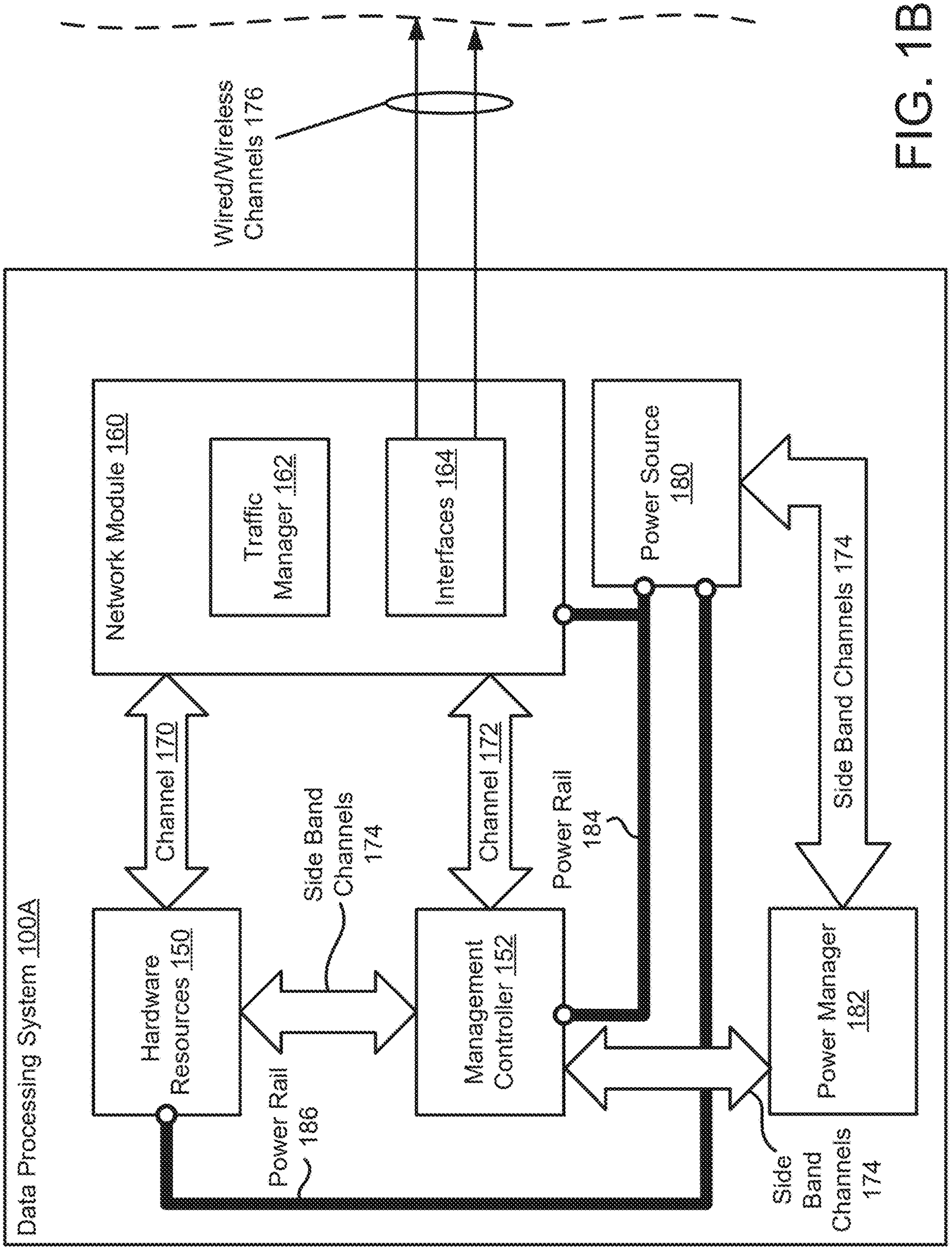
FIG. 1B shows a second block diagram illustrating a data processing system in accordance with an embodiment.

The system may include any number of data processing systems 100 (e.g., computing devices) that may each include any number of hardware components (e.g., processors, memory modules, storage devices, communication devices, etc.). The hardware components may support execution of any number and types of applications (e.g., software components). Changes in available functionalities of the hardware and/or software components may provide for various types of different computer-implemented services to be provided over time. Refer to FIG. 1B for additional details regarding data processing systems 100.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, data processing systems 100, management system 102, and/or any other type of devices (not shown in FIG. 1A). Other types of computer-implemented services may be provided by the system shown in FIG. 1A without departing from embodiments disclosed herein.

The computer-implemented services may be provided at least in part, by hardware resources of data processing systems 100. To provide the computer-implemented services, a data processing system may perform a booting process to initialize operation of the hardware resources. To do so, a processor (e.g., a central programming unit (CPU)) of the hardware resources may utilize boot data (e.g., basic input/output system (BIOS) firmware, system configuration files, etc.) that may be stored on a boot storage device. The boot storage device may include, for example, a non-volatile memory storage device (e.g., serial peripheral interface flash).

By performing the booting process, the hardware resources of the data processing system may be operably connected to each other (e.g., via in-band channels) and an operating system may be loaded to provide management functionality.

However, an unrecoverable boot failure may occur when the processor is unable to perform the booting process using a verified recovery image stored on the boot storage device and/or a boot partition of the storage device. For example, the processor may be unable to perform the booting process when the recovery images hosted by the boot storage device and/or the boot partition of the storage device includes erroneous data (e.g., corrupted firmware, malicious data, incompatible firmware version, etc.), a firmware image is improperly flashed on the boot storage device and/or boot partition of the storage device, and/or any other causes impacting an ability of the processor to perform the boot of the data processing system. Consequently, at least a portion of the hardware resources may be inoperable.

To modify operation of the data processing system in an event of compromise and/or reduced functionality of at least a portion of the hardware resources, the data processing system may host a management controller that may operate independently from the hardware resources and may be distinct from and adapted to manage the hardware resources. For example, the management controller may operate during the booting process and/or regardless of an outcome of the booting process performed by booting components (e.g., the boot storage device and/or the processor) of the hardware resources.

In general, embodiments disclosed herein relate to systems, devices, and methods for managing operation of a data processing system. To manage the operation of a data processing system, the management controller may obtain and store a recovery image to a boot partition of a storage device hosted by hardware resources of the data processing system in an event that the processor is unable to perform the booting process using corrupt recovery data hosted by the boot storage device and/or boot partition of the storage device.

Thus, to improve a likelihood that the data processing system may successfully perform a booting process, the management controller may obtain a recovery image from a remote entity in the event that the processor is unable to perform the booting process using corrupted recovery image hosted by the boot storage device and/or the boot partition of the storage device. The recovery image include recovery files, configurations, etc. usable to boot the data processing system into a desired operating state (e.g., via the processor performing a successful boot of the data processing system).

To identify the occurrence of the unrecoverable boot failure, the management controller may monitor a boot status by obtaining information regarding the booting process from the processor using a side band communication channel. If all recovery images are unusable (e.g., corrupted, not stored within one of the storage devices, etc.), the management controller may obtain a copy of the recovery image from a remote entity using out-of-band communication methods and store the recovery image in a boot partition of a storage device hosted by hardware resources of the data processing system.

The management controller may provide and/or obtain (e.g., read and/or write) data from the boot partition using a second side band communication channel. For example, the management controller may store an updated copy of the recovery image to the boot partition of the storage device and/or perform any other actions.

Once obtained, the recovery image may be used by the processor of the hardware resources to subsequently initiate a new boot process to place the data processing system in a desired operating state (e.g., successfully perform a boot of the data processing system).

To provide the above noted functionality, the system may include data processing systems 100, management system 102, and user devices 104. Each of these components is discussed below.

Data processing systems 100 may include any number of data processing systems (e.g., 100A-100N) that may individually and/or cooperatively provide at least a portion of the computer-implemented services. Any of data processing systems 100 may include in-band components (e.g., hardware resources), out-of-band components (e.g., management controller, network modules, etc.), and functionality that may allow the out-of-band components to communicate with management system 102 via an out-of-band communication channel.

While providing the at least a portion of the computer-implemented services, a data processing system (e.g., 100A) of data processing systems 100 may communicate with and/or obtain information from management system 102. For example, data processing system 100A may obtain instructions relevant to updated boot software (e.g., an updated firmware version), implementing a boot software recovery policy, management requests to modify operation of the hardware resources (e.g., installing new applications), and/or any other information. Data processing system 100A may subsequently perform actions based on the information obtained from management system 102 to update operation of data processing system 100A.

Management system 102 may, as discussed above, provide remote management services. Management system 102 may include, for example, a second data processing system operated an owner of data processing systems 100. To provide the remote management services, management system 102 may interact with data processing systems 100 to obtain and/or provide information (e.g., data) relevant to operation of data processing systems 100. For example, management system 102 may generate and provide a boot data recovery policy to a data processing system of data processing systems 100 for use in storing a latest stable copy of boot data in a boot partition, restoring boot data hosted on a boot storage device of the data processing system, and/or any other purposes.

User devices 104 may include any number and/or type of user devices (e.g., 104A-104N) that may individually and/or cooperatively provide at least a portion of the computer-implemented services. User devices 104 may be operated by users and/or may provide computer-implemented services such as telemetry services, recovery services, etc. based on the users' operation. To perform its functionality, user devices 104 may communicate (e.g., exchange data) with the out-of-band components of data processing systems 100 using a local connection 108 (e.g., point-to-point communication link) with data processing systems 100. For example, user device 104A may use a point-to-point communication link (e.g., local connection 108) to provide an identity (e.g., unique identifier) for the respective user device to data processing system 100A, obtain instructions relevant to updated recovery images, manage requests to obtain recovery images from remote entities (e.g., management system 102), and/or for any other purposes. User devices 104 may subsequently perform actions based on the information obtained from data processing system 100A and/or management system 102 to facilitate obtainment of recovery image usable to boot the data processing system into a desired operating state.

Figure 2A:
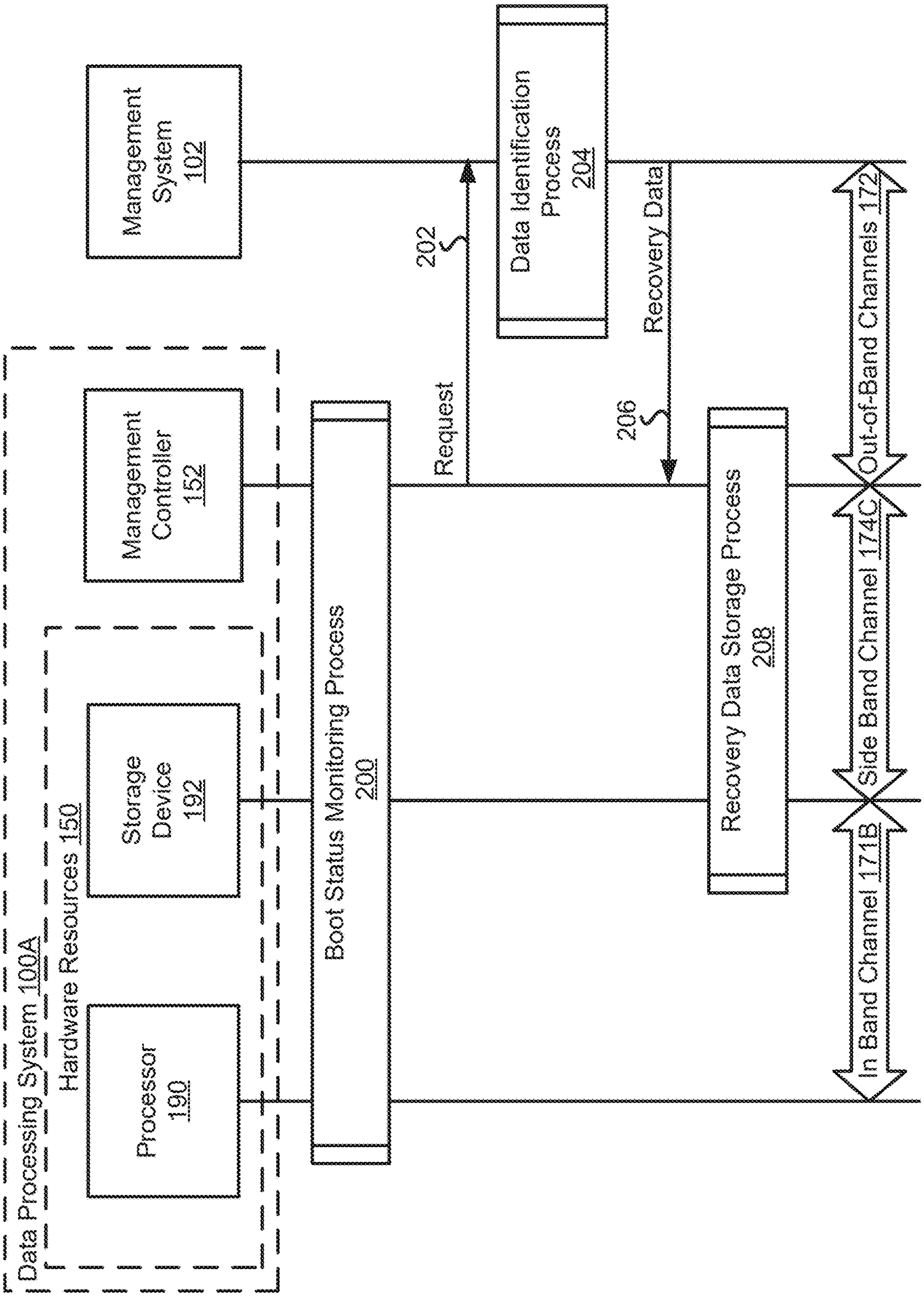
FIGS. 2A-2B show interaction diagrams in accordance with an embodiment.
Figure 2B:
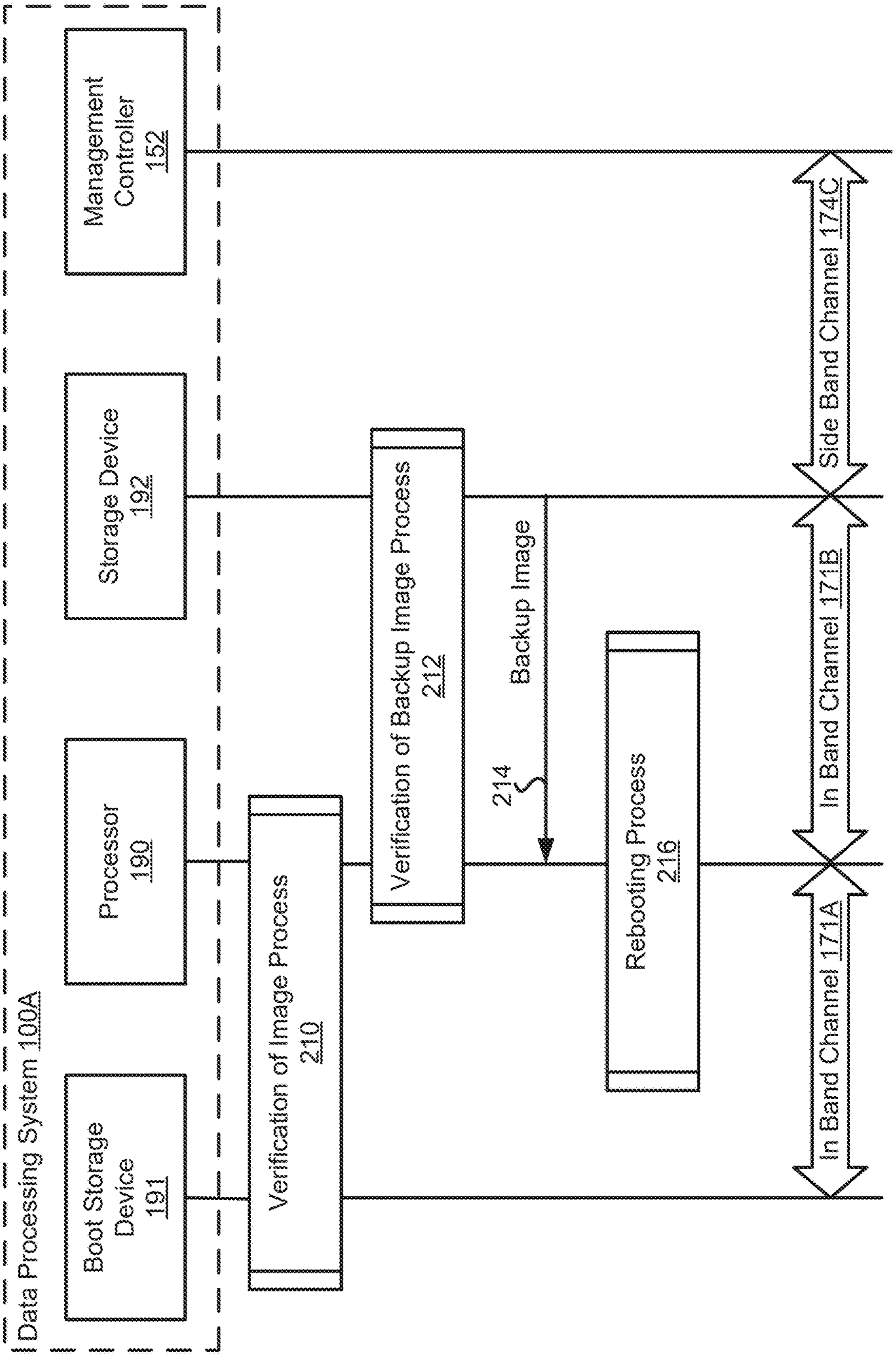
Figure 3:
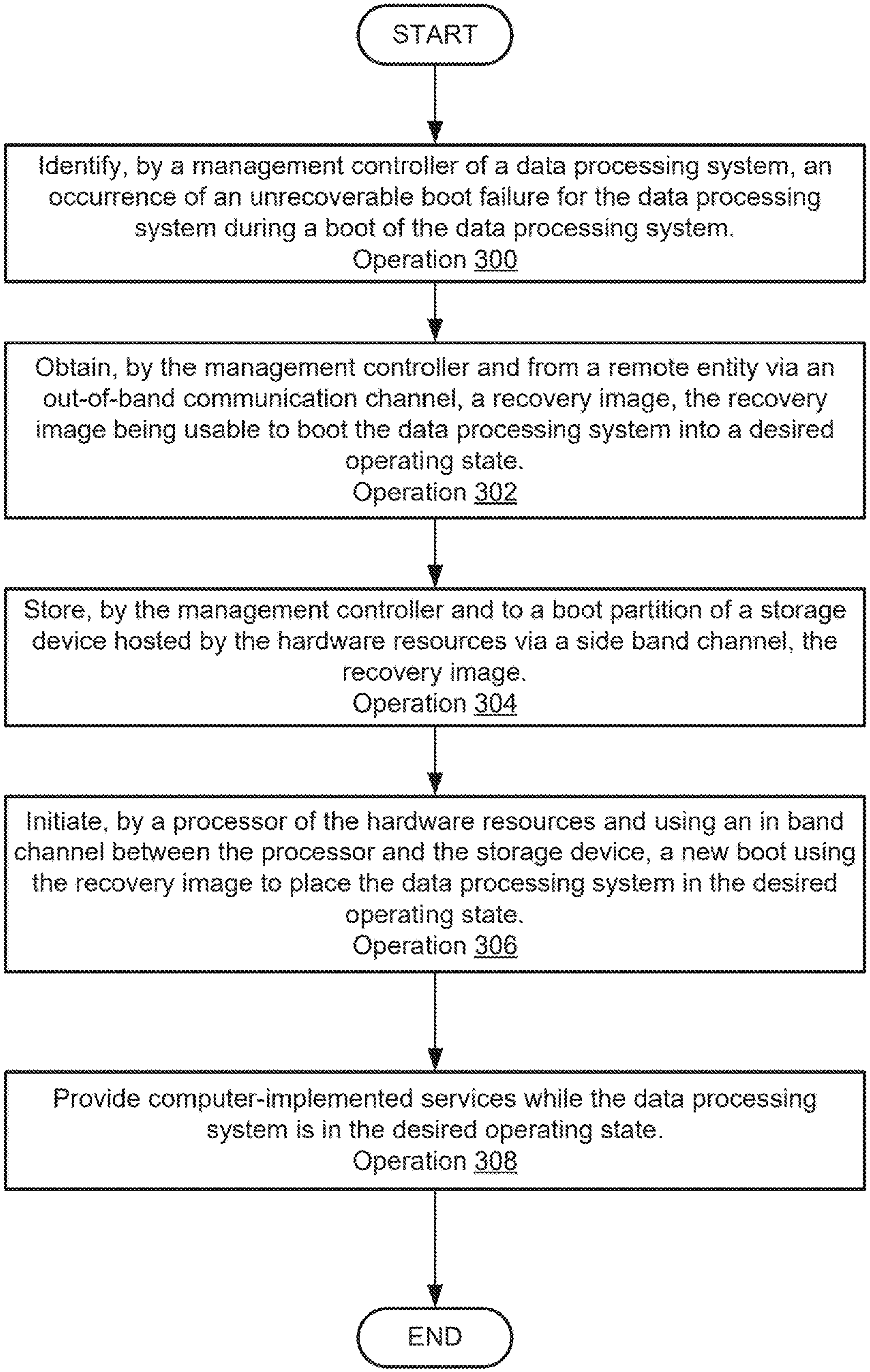
FIG. 3 shows a flow diagram illustrating a method of managing operation of a data processing system in accordance with an embodiment.

While providing their functionality, any of data processing systems 100, management system 102, and user devices 104 may provide all or a portion of the methods shown in FIGS. 2A-3.

Communication system 106 may allow any of data processing systems 100, and management system 102 to communicate with one another (and/or with other devices not illustrated in FIG. 1A). To provide its functionality, communication system 106 may be implemented with one or more wired and/or wireless networks. Any of these networks may be a radio access network (e.g., a cellular core network), a private network (e.g., the "Network" shown in FIG. 4), a public network, and/or may include the Internet. For example, data processing systems 100 may be operably connected to management system 102 via the Internet. Data processing systems 100, management system 102, and/or communication system 106 may be adapted to perform one or more protocols for communicating via communication system 106.

Any of (and/or components thereof) data processing systems 100, and management system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Thus, as shown in FIG. 1A, a system in accordance with an embodiment may manage operation of a data processing system by obtaining and storing a recovery image to a boot partition of a storage device hosted by hardware resources of the data processing system when an unrecoverable boot failure is identified by a management controller of the data processing system. By doing so, the data processing system may be rebooted using the recovery image to place the data processing system in desired operating state.

While providing their functionality, any of data processing systems 100, management system 102, and user devices 104 may provide all or a portion of the methods shown in FIGS. 2A-3.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol). Communication system 106 may include any number of in-band communication channel and/or out-of-band communication channels.

While illustrated in FIG. 1A as including a limited number of specific components, a system in accordance with an embodiment may include fewer, additional, and/or different components than those illustrated therein. For example, while the system of FIG. 1A shows a single management system (e.g., 102), it will be appreciated that the system may include any number of management systems.

Turning to FIG. 1B, a diagram illustrating data processing system 100A in accordance with an embodiment is shown. Data processing system 100A may be similar to any of data processing systems 100A-100N shown in FIG. 1A.

To provide computer-implemented services, data processing system 100A may include any quantity of hardware resources 150. Hardware resources 150 may be in-band hardware components, and may include a processor operably coupled to memory, storage, and/or other hardware components. Hardware resources 150 may (e.g., via the processor) provide the computer-implemented services desired by users of data processing system 100.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100) to another device via any number of intermediate networks (e.g., via wired/wireless channels 176 that are part of the networks).

In addition, different configurations of hardware resources 150 and/or software resources may be implemented by data processing system 100 based on the type of computer-implemented services that are to be provided. Modifications to configurations of hardware resources 150 and/or the software resources may lead to downtime for data processing system 100 and may consume network bandwidth of channel 170.

To reduce the likelihood of the applications and/or other in-band entities from being indirectly compromised, data processing system 100 may include management controller 152 and network module 160. Each of these components of data processing system 100 is discussed below.

Management controller 152 may operate independently from hardware resources 150 and, therefore, hardware resources 150 may not host and/or manage operation of management controller 152. In addition, management controller 152 may be distinct from hardware resources 150 and, therefore, may be physically separate from hardware resources 150. Management controller 152 may also be operably connected to communication components of data processing system 100 via separate channels (e.g., 172) from the in-band components.

Management controller 152 may be implemented, for example, using a system on a chip or other type of independently operating computing device (e.g., independent from the in-band components, such as hardware resources 150, of a host data processing system 100). Management controller 152 may provide various management functionalities for data processing system 100. For example, management controller 152 may monitor various ongoing processes performed by the in-band component, may manage power distribution, thermal management, and/or other functions of data processing system 100A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Information provided to the application by management controller 152 may include, for example, instructions for implementation of computer-implemented services desired by users of data processing system 100.

To facilitate communication with other devices, data processing system 100 may include network module 160. Network module 160 may provide communication services for in-band components and out-of-band components (e.g., management controller 152) of data processing system.

To provide the above-described functionalities, network module 160 may include traffic manager 162, interfaces 164, and may host an instance of a TCP/IP stack to facilitate communication with other devices independently of any of the in-band components (e.g., does not rely on any hosted software, hardware components, etc.). Accordingly, compromise of any of hardware resources 150 and hosted component may not result in indirect compromise of network module 160, management controller 152, and entities hosted by management controller 152.

Management controller 152 may be operably connected to communication components of data processing system 100 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 100 may include network module 160. Network module 160 may provide communication services for in-band components and out-of-band components (e.g., management controller 152) of data processing system 100. To do so, network module 160 may include traffic manager 162 and interfaces 164.

Traffic manager 162 may include functionality to (i) discriminate traffic directed to various network endpoints advertised by data processing system 100, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 100 may appear to be two independent network entities, that may independently addressable, and otherwise unrelated to one another.

Network module 160 may utilize the instance of the TCP/IP stack to allow hardware resources 150 and/or management controller 152 to communicate with other devices via packet switched networks and/or other types of communication networks.

To facilitate management of data processing system 100 over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, management controller 152 may perform all, or a portion, of the methods and operations described in FIG. 2A.

While illustrated in FIG. 1B with a limited number of specific components, a system may include additional, fewer, and/or different components without departing from embodiments disclosed herein.

Figure 1C:
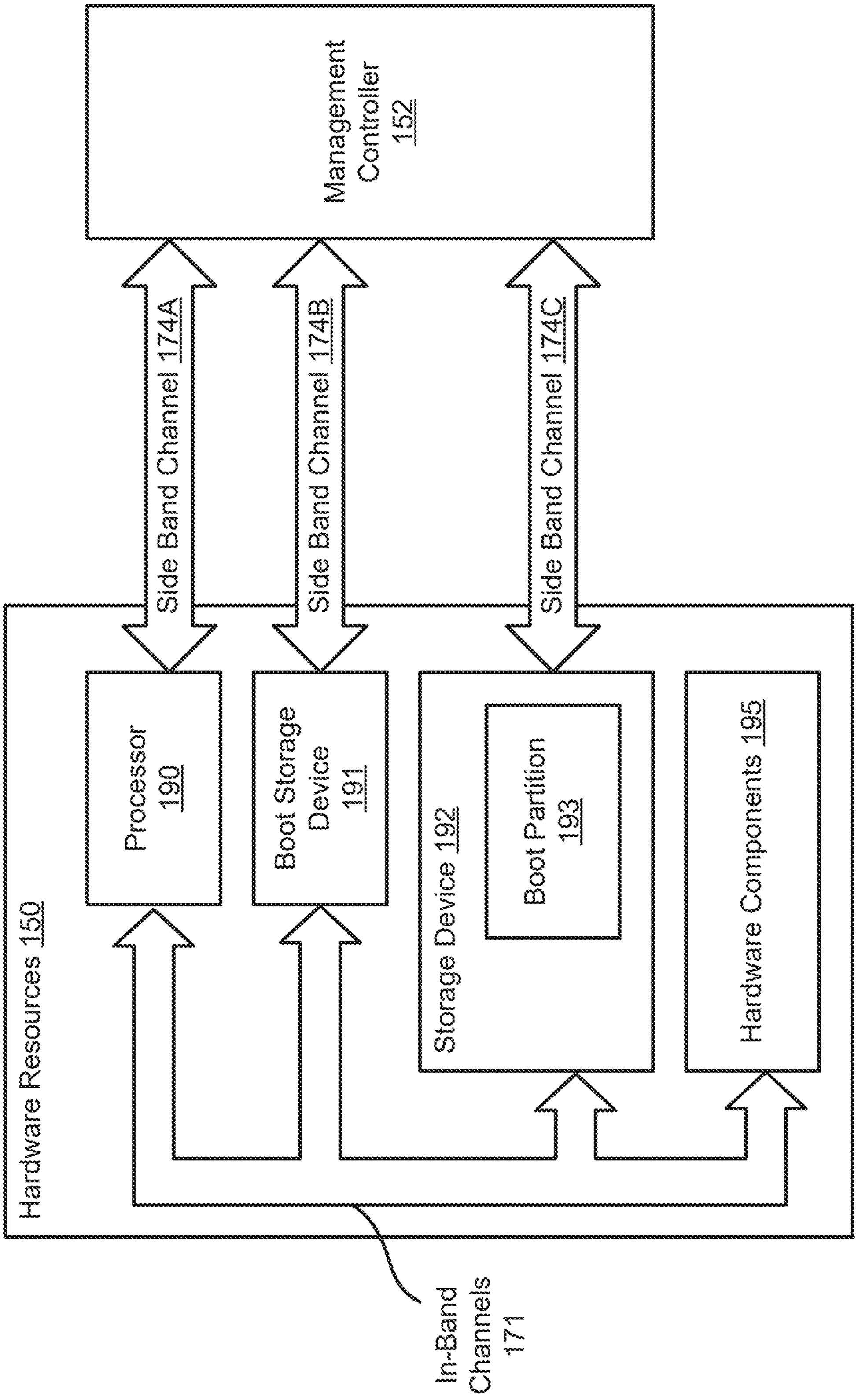
FIG. 1C shows a third block diagram illustrating a data processing system in accordance with an embodiment.

Turning to FIG. 1C, to provide computer-implemented services, hardware resources 150 may host processor 190, boot storage device 191, and storage device 192. For example, to place a data processing system (e.g., 100A) in a desired operating state, data processing system 100A may perform a booting process to initialize hardware resources and facilitate operation of an operating system. To do so, processor 190 may execute instructions indicated by boot data (e.g., firmware, system configuration, etc.) hosted by boot storage device 191.

Boot storage device 191 may include, for example, non-volatile flash memory (e.g., serial peripheral interface (SPI) flash) that may be hosted on a motherboard and adapted to store information, such as firmware, an image of a management entity (BIOS, universal extensible firmware interface (UEFI), etc.), system configuration files, and/or any other information usable to boot data processing system 100A. Because boot storage device 191 may have a limited storage capacity, storage device 192 may be used to store additional information (e.g., other copies of boot data).

Storage device 192 may include, for example, a second storage device such as a non-volatile memory express (NVMe) based solid-state drive. Storage device 192 may include a boot partition (193) that may be configured to store data usable to boot data processing system 100A (e.g., a latest stable copy of boot data, bootloader files, configuration files, etc.). Boot partition 193 may include an allocated section of storage device 192 that may, for example, be isolated from other memory sections of storage device 192.

Processor 190 may include a central processing unit (CPU) that may interact with any number and/or type of other hardware components (e.g., boot storage device 191, storage device 192, and hardware components 195). For example, when data processing system 100A is powered on, processor 190 may be initialized to a predetermined state and directed to retrieve instructions (e.g., via a reset vector) from boot storage device 191. To interact with boot storage device 191, storage device 192, and/or the other hardware components, processor 190 may be operably connected to each of the components via in-band channels 171.

However, at least a portion of in-band channels 171 may not be functional and/or may have reduced functionality during booting of data processing system 100A and/or as a result of an undesired boot event. For example, in an event that storage device 192 and/or hardware components 195 are not initialized during booting, processor 190 may not be able to communicate with storage device 192 to obtain a copy of boot data (e.g., a backup copy, a recovery file, etc.) for use in rebooting and placing data processing system 100A in a desired operating state.

Thus, to improve a likelihood that data processing system 100A may be booted and placed in the desired operating state, management controller 152 may perform management functionalities using any number and/or type of side band channels (e.g. 174). For example, management controller may obtain information (e.g., telemetry data, process results, boot times, etc.) regarding a boot status from processor 190 using side band channel 174A, replace a copy of undesired boot data hosted by boot storage device 191 with a latest stable copy of boot data using side band channel 174B, read and/or write boot data to boot partition 193 of storage device 192 using side band channel 174C, and/or perform any other actions by communicating with components of hardware resources regardless of a boot status of data processing system 100A.

To further clarify embodiments disclosed herein, interaction diagrams in accordance with an embodiment are shown in FIGS. 2A-2B. The interaction diagrams may illustrate how data may be obtained and used within the system of FIGS. 1A-1C.

In the interaction diagram, processes performed by and interactions between components of a system in accordance with an embodiment are shown. In the diagram, components of the system are illustrated using a first set of shapes (e.g., 190, 191, etc.), located towards the top of each figure. Lines descend from these shapes. Processes performed by the components of the system are illustrated using a second set of shapes (e.g., 200, 210, etc.) superimposed over these lines.

Interactions (e.g., communication, data transmissions, etc.) between the components of the system are illustrated using a third set of shapes (e.g., 202, 204, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 202 may occur prior to the interaction labeled as 206. However, it will be appreciated that the processes and interactions may be performed in different orders, any may be omitted, and other processes or interactions may be performed without departing from embodiments disclosed herein.

The processes shown in FIG. 2A may be performed by any entity shown in the systems of FIGS. 1A-1C (e.g., a device similar to data processing system 100A, a device similar to management system 102, etc.) and/or another entity without departing from embodiments disclosed herein.

Turning to FIG. 2A, a first interaction diagram in accordance with an embodiment is shown. The interaction diagram may illustrate processes and interactions that may occur during startup of a data processing system when an unrecoverable boot failure is identified to have occurred during a boot of the data processing system.

To identify that an unrecoverable boot failure has occurred, boot status monitoring process 200 may be performed. During boot status monitoring process 200, processor 190 may attempt to boot data processing system 100A using boot data hosted by boot storage device 191 (e.g., described above and shown in FIG. 1C), and management controller 152 may monitor the boot via a side band communication channel. For example, processor 190 may attempt to boot data processing system 100A by receiving a reset signal (e.g., via a power-on process), initializing registers, retrieving data (e.g., BIOS, UEFI, etc.) stored on boot storage device 191 via an in-band channel (e.g., in band channels 171 shown in FIG. 1C), attempting to execute instructions (e.g., firmware code) based on the data, and/or performing any other actions.

During boot status monitoring process 200, processor 190 may attempt to boot data processing system 100A using boot data hosted by storage device 192 (e.g., described above and shown in FIG. 1C), and management controller 152 may monitor the boot via a side band communication channel. For example, processor 190 may attempt to boot data processing system 100A by receiving a reset signal (e.g., via a power-on process), initializing registers, retrieving data (e.g., BIOS, UEFI, etc.) stored on storage device 192 via an in-band channel 171B, attempting to execute instructions (e.g., firmware code) based on the data, and/or performing any other actions.

While attempting to boot, processor 190 may be operably connected to storage device 192 via in-band channel 171B but may not operably connected to boot storage device 191 (and/or any other hardware components). In-band channel 171B may include, for example, a limited communication channel between processor 190 and storage device 192 that may be facilitated using a signal multiplexer that may enable processor 190 to communicate with storage device 192 (e.g., using a system bus) while limiting communication with the other hardware components prior to a management entity (e.g., an operating system, drivers, etc.) being loaded as a result of a successful booting.

Accordingly, management controller 152 may monitor and/or obtain information from processor 190 using side band channel 174A. For example, management controller 152 may obtain data (e.g., telemetry data) from processor 190, compare the data to criteria (e.g., a boot timeout time), and determine that an unrecoverable boot failure has occurred, management controller may obtain a copy of recovery data useable to boot the data processing system into a desired operating state.

At interaction 202, a request may be provided to management system 102 from management controller 152. The request may include, for example, a request for recovery data (e.g., an image of a management entity, firmware, system configuration files, etc.), an identifier for the recovery image, an identifier for data processing system 100A, and/or any other information. The request may be provided by (i) selectively powering on a network module of the data processing system (e.g., via changing from a depowered state to a powered state by management controller 152), (ii) transmitting the request for recovery data to management system 102 via out-of-band channel 174, (iii) transmitting, by the management controller, the request for the recovery data to a user device using a local connection, (iv) providing, by the user device, the request for the recovery data to management system 102, and/or (v) via any other processes.

Once obtained, the request may be used to initiate identification of the recovery data for the respective data processing system (e.g., data processing system 100A). To do so, data identification process 204 may be performed. During data identification process 204, the recovery data (e.g., data usable for booting) for the respective data processing system (e.g., data processing system 100A) may be identified. To identify the recovery data for data processing system 100A, any type of identification process may be performed.

Once identified and at interaction 206, recovery data may be obtained by management controller 152 from management system 102. The recovery image may include, for example, a copy of an image of a management entity, system configuration files, firmware, and/or any other information. To obtain the recovery data, management controller 152 may receive the recovery data from a remote entity, for example, management system 102 via out-of-band communication channels (e.g., out-of-band channels 172). Once obtained, the recovery data may be stored, at least temporarily, by management controller 152.

While illustrated in FIG. 2A as receiving the recovery data from management system 102, obtaining the recovery data may include: (i) providing, by management controller 152, a request for the recovery data to a user device (e.g., any of user devices 104) via a local connection (e.g., point-to-point communication link), (ii) providing, by the user device to a remote entity (e.g., management system 102), the recovery data in response to the request, (iii) receiving, from management system 102 by the user device, the recovery data, (iv) obtaining, by management controller 152 from the user device, the recovery data, and/or by performing any other processes.

Once the recovery data is obtained, recovery data storage process 208 may be performed. During recovery data storage process 208, the recovery data may be stored in a boot partition (e.g., boot partition 193 shown in FIG. 1C) of storage device 192. To store the recovery data in the boot partition of storage device 192, management controller 152 may make a determination whether the boot partition of storage device 192 for storing the recovery data exists and if so, a request to write data to the boot partition (e.g., boot partition 193), address for the boot partition, and/or any other information may be provided to storage device 192.

If determined that the boot partition does not exist, management controller 152 may create the boot partition independently using a side band channel to storage device 192. For example, the boot partition (e.g., boot partition 193) may be created by management controller 152 using side band channel 174C in a manner that is independent of the cooperation with any management entities of hardware resources 150 of the data processing system.

To create the boot partition on storage device 192, a portion of storage resources of storage device 192 may be allocated for recovery data. For example, to allocate the portion of storage resources, a size of a partition (e.g., a logical partition) may be configured, the portion of storage resources may be formatted, and/or nay other actions may be performed to establish the boot partition. Once established, the boot partition (e.g., 193) may store recovery data that may be isolated from other data stored on storage device 192.

At part of performing recovery data storage process 208, the recovery data may be provided to boot partition 193 of storage device 192 for storage. For example, the recovery data may be stored on the boot partition by (i) issuing, by management controller 152, a write request to storage device 192 via side band channel 174C, (ii) identifying, by storage device 192, a physical storage location (e.g., a flash memory cell) for the boot partition, (iii) writing the recovery data to the storage location, and/or performing any other actions.

In addition, recovery data storage process 208 may also include removing a copy of the recovery data (e.g., that may include erroneous data causing the unrecoverable boot failure) hosted by storage device 192, and/or adding the recovery image to the boot partition with metadata distinguishing the recovery image from the corrupted recovery image. To do so, the existing, corrupted recovery image stored on storage device 192, for example, may be removed by deleting the existing, corrupted recovery image from the non-volatile memory express based solid-state drive.

Side band channels (e.g., 174A-174C) may be used to facilitate communication between management controller 152 and storage device 192, and are shown to indicate that management controller 152 may interface with processor 190, startup storage device 191, and storage device 192 regardless of a status of in-band channels (e.g., that may have reduced functionality due to the unrecoverable boot failure). Using the side band channels, management controller 152 may perform management commands that may include, for example, accessing secured data, providing instructions to use the data, obtaining information regarding an operating state of hardware resources 150, installing management entities on hardware resources 150 using the data, and/or performing any other actions.

Thus, using processes and interactions shown in FIG. 2A, a recovery image may be obtained and stored, using a management controller, in a boot partition of a storage device hosted by the data processing system. By doing so, the recovery image may be obtained, by a management controller, when an unrecoverable boot failure is identified during a future booting of the data processing system and used to initiate a new boot of the data processing system to place the data processing system in a desired operating state.

Turning to FIG. 2B, a second interaction diagram in accordance with an embodiment is shown. The interaction diagram may illustrate processes and interactions that may occur during rebooting of a data processing system when an unrecoverable boot failure is identified to have occurred during a boot of the data processing system.

To perform a reboot of the data processing system, a recovery image usable to boot data processing system 100A into a desired operating state may be obtained. To obtain the recovery image, verification of image process 210 may be performed. During verification of image process 210, processor 190 may attempt to verify a copy of recovery image is hosted by boot storage device 191. For example, processor 190 may verify an integrity of the recovery data (e.g., recovery firmware, system configuration files, etc.). Any type of verification processes may be performed to verify the copy of the recovery image usable to place data processing system in a desired operating state is hosted by boot storage device 191. For example, processor 190 may obtain a hash of a recovery image in boot storage device 191 (via in-band channel 171A) to compare to a known good hash. If verified, the recovery image may be used to boot data processing system 100A into a desired operating state. If the verification is unsuccessful, processor 190 may attempt to perform a second verification process.

To do so, verification of backup image process 212 may be performed. During verification of backup image process 212, a backup copy of the recovery image stored in the boot partition 193 of storage device 192 may be verified by processor 190 (e.g., via in-band channel 171B). For example, processor 190 may verify an integrity of the backup copy of the recovery image stored in boot partition 193. Any type of verification processes may be performed to verify the backup copy of the recovery image is usable to place data processing system 100A into a desired operating state. If verified, the backup copy of the recovery image may be used to boot data processing system 100A.

At interaction 214, backup image may be provided to processor 190 by the boot partition 193 of storage device 192. For example, the backup image may be provided by: (i) locating the requested backup image (e.g., on the boot partition of storage device 192), (ii) transferring the backup image to processor 190 via in-band channel 171B and/or using a data transfer protocol (e.g., non-volatile memory express, universal serial bus, etc.), and/or via any other processes. The backup image may include a version of the recovery image usable to boot data processing system 100A into a desired operating state. Refer to FIG. 2A for additional information regarding obtaining the recovery image.

Once obtained, rebooting process 216 may be performed to attempt to boot data processing system 100A using the backup image. Rebooting process 216 may be initiated by processor 190, as a result of a configuration (e.g., based on an update to storage resources hosted by storage device 192), and/or via any other mechanisms. During rebooting process 216, processor 190 may retrieve the recovery image from the boot partition of storage device 192, execute instructions (e.g., firmware code) based on the backup image, initialize hardware resources, and provide control to a management entity.

By executing the instructions based on the backup image, processor 190 may perform operations that may place data processing system 100A in a desired state (e.g., completion of the boot of the hardware resources of data processing system 100A). For example, software and/or hardware resources may be validated (e.g., during a power on self-test), the hardware resources may be configured and/or initialized, an operating system may be loaded to memory of data processing system 100A (e.g., using a bootloader), and/or any other actions may be performed.

Thus, using processes and interactions shown in FIG. 2B, a recovery image may be verified and obtained by a processor of a data processing system and used to boot a data processing system in an event that the data processing system is unable to recover from attempted boot failure. By doing so, the data processing system may be places in a desired operating state for providing computer-implemented services.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-1C may perform various methods to manage a data processing system. FIG. 3 illustrate a method that may be performed by the components of the system of FIGS. 1A-1C. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing operation of a data processing system in accordance with an embodiment is shown. The method may be performed, for example, by a data processing system, a management system, a communication system, a management controller, hardware resources, and/or other components illustrated in FIGS. 1A-2B.

At operation 300, an occurrence of an unrecoverable boot failure for a data processing system during a boot of the data processing system may be identified. The occurrence of the unrecoverable boot failure may be identified by a management controller of the data processing system. Because in-band channels may have limited functionality during the booting and/or as a result of the undesired boot event, the management controller may obtain information (e.g., telemetry data, results of processes performed, etc.) regarding the booting from a processor of the data processing system using a side band channel. For example, management controller 152 may detect that a system hang (e.g., a boot timeout) based on the information.

At operation 302, a recovery image may be obtained. The recovery image may be obtained by the management controller and from a remote entity via an out-of-band methods described with respect to FIGS. 1A-2B and/or by other out-of-band communication methods. For example, to avoid using any potentially unavailable hardware resources (e.g., in-band components) of the data processing system, the management controller may utilize the out-of-band communication channel to send a request for a copy of the recovery image to a remote entity (e.g., management system 102, user devices 104, etc.) via a network module. A response to the request may be obtained, for example, by the management controller from the remote entity via the out-of-band communication channel. The response, for example, may include a copy of the recovery image, instructions regarding the recovery image, and/or any other information.

At operation 304, the recovery image may be stored. The recovery image may be stored by the management controller and to a boot partition of a storage device hosted by the hardware resources via a side band channel using methods described with respect to FIGS. 1A-2B and/or by other side band communication methods. Storing the recovery image may be facilitated by: (i) identifying whether a boot partition exists on the storage device, (ii) cooperatively, between the management controller and the storage device, allocating a portion of storage resources of the storage device to create the boot partition in an instance where the boot partition does not exist, (iii) issuing, by the management controller, a write request to the storage device to store the recovery image to the boot partition, and/or via any other processes.

At operation 306, a new boot may be initiated using the recovery image to place the data processing system in the desired operating state. The new boot may be initiated by a processor of the hardware resources and using an in band channel between the processor and the storage device. The new boot may be initiated by: (i) sending a reset signal to the processor (e.g., by the management controller), (ii) triggering a new boot based on an update to the storage device, (iii) executing instructions indicated by the recovery image, (iv) loading an operating system into memory of the data processing system, and/or performing any other actions to place the data processing system in a desired operating state.

At operation 308, computer-implemented services may be provided by the data processing system and while in the desired operating state. The computer-implemented services may be provided by: (i) installing a new management entity (e.g., an application, driver, firmware etc.), (ii) providing an interface for a user of the data processing system, and/or via any other processes.

The method may also include: prior to obtaining the recovery image (e.g., during operation 302): a network module of the hardware resources may be selectively started to facilitate future communication between the management controller and a remote entity prior to successful completion of any other startup following a startup failure.

The hardware resources may be governed using a policy that requires that the network module may not be usable to communicate with remote entities during attempts to startup the hardware resources. The network module may be selectively started by changing a power state of the network module, for example, from a depowered state (e.g., powered off) to a powered state (e.g., powered on).

The method may end following operation 308.

Using the method shown in FIG. 3, operation of a data processing system may be managed using a management controller to obtain and to store a recovery image hosted by a storage device in an event that an unrecoverable boot event is identified during an attempted booting of the data processing system. The management controller may use side band channels to perform monitor the booting of the data processing system, obtain the recovery image from a remote entity via out-of-band communication methods and/or store the recovery image in a boot partition of the storage device. By doing so, a processor hosted by the hardware resources may initiate a new boot using the recovery image to boot the data processing system into a desired operating state.

Figure 4:
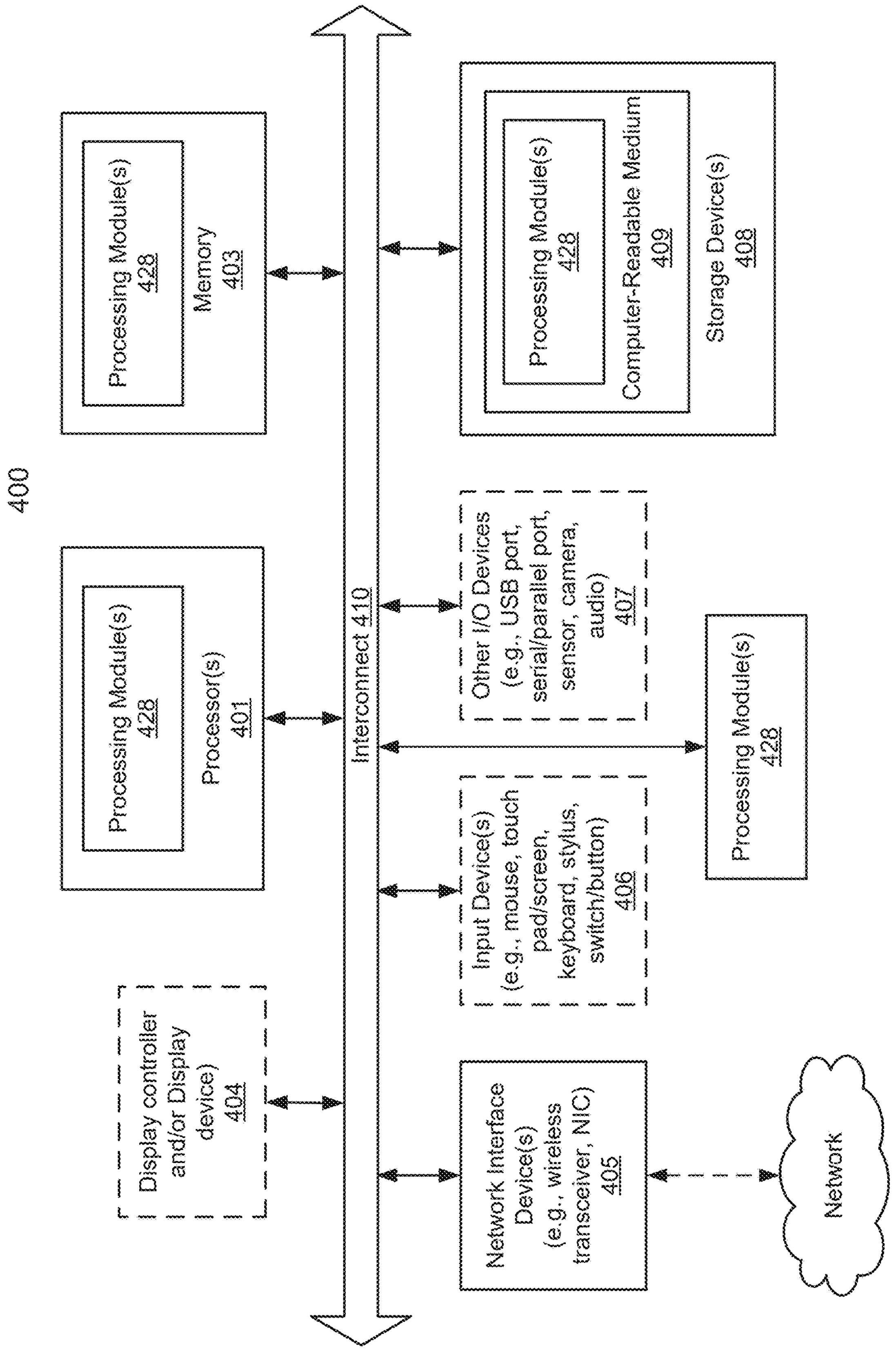
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing operation of a data processing system, the method comprising:

identifying, by a management controller of the data processing system, an occurrence of an unrecoverable boot failure for the data processing system during a boot of the data processing system;

based on the identifying:

obtaining, by the management controller and from a remote entity via an out-of-band communication channel, a recovery image, the recovery image being usable to boot the data processing system into a desired operating state;

storing, by the management controller and to a boot partition of a storage device hosted by hardware resources via a side band channel, the recovery image;

initiating, by a processor of the hardware resources and using an in-band channel between the processor and the storage device, a new boot using the recovery image to place the data processing system in the desired operating state; and providing computer-implemented services while the data processing system is in the desired operating state.

2. The method of claim 1, wherein the unrecoverable boot failure is due to all images usable to complete the boot being corrupted.

3. The method of claim 1, wherein the hardware resources comprise the processor, a boot storage device, and the storage device, wherein the hardware resources are connected via at least one in-band channel.

4. The method of claim 3, wherein the at least one in-band channel is used to provide the computer-implemented services.

5. The method of claim 3, wherein the management controller being independently operational from the hardware resources while connected to the hardware resources via side-band channels during the boot of the data processing system.

6. The method of claim 1, wherein obtaining the recovery image comprises:

selectively powering, by the management controller, a network module;

providing, by the management controller and via the network module, a request for the recovery image to a remote entity; and receiving, by the management controller and via the network module, the recovery image in response to the request.

7. The method of claim 1, further comprising:

prior to the storing of the recovery image:

selectively powering, by the management controller and via a side band channel, the storage device to gain access to the boot partition, wherein a corrupt recovery image stored in the boot partition is identified while the storage device is selectively powered and other components of the hardware resources are depowered, the corrupt recovery image being unusable during the boot to place the data processing system in the desired operating state.

8. The method of claim 1, further comprising:

after identifying the occurrence of the unrecoverable boot failure and prior to obtaining the recovery image, selectively powering, by the management controller, the storage device, wherein the recovery image is stored in the boot partition while the storage device is selectively powered and other components of the hardware resources are depowered.

9. The method of claim 1, wherein storing the recovery image comprises performing at least one action selected from a list of actions consisting of:

removing a corrupted recovery image stored in the storage device; and adding the recovery image to the boot partition with metadata distinguishing the recovery image from the corrupted recovery image.

10. The method of claim 1, further comprising:

after identifying the occurrence of the unrecoverable boot failure and prior to obtaining the recovery image:

providing, by the management controller and using a local communication channel, a request for the recovery image to a user device, the local communication channel being a direct communication link that allows transmission of information between the management controller and the user device without using any networks; and forwarding, by the user device, the request for the recovery image to the remote entity in order to obtain the recovery image for the data processing system.

11. A non-transitory machine-readable medium having instructions stored therein, which when executed by a processor, cause the processor to perform operations for managing operation of a data processing system, the operations comprising:

identifying, by a management controller of the data processing system, an occurrence of an unrecoverable boot failure for the data processing system during a boot of the data processing system;

based on the identifying:

obtaining, by the management controller and from a remote entity via an out-of-band communication channel, a recovery image, the recovery image being usable to boot the data processing system into a desired operating state;

storing, by the management controller and to a boot partition of a storage device hosted by hardware resources via a side band channel, the recovery image;

initiating, by the processor of the hardware resources and using an in-band channel between the processor and the storage device, a new boot using the recovery image to place the data processing system in the desired operating state; and providing computer-implemented services while the data processing system is in the desired operating state.

12. The non-transitory machine-readable medium of claim 11, wherein the unrecoverable boot failure is due to all images usable to complete the boot being corrupted.

13. The non-transitory machine-readable medium of claim 11, wherein the hardware resources comprise the processor, a boot storage device, and the storage device, wherein the hardware resources are connected via at least one in-band channel.

14. The non-transitory machine-readable medium of claim 13, wherein the at least one in-band channel is used to provide the computer-implemented services.

15. The non-transitory machine-readable medium of claim 11, further comprising:

prior to the storing of the recovery image:

selectively powering, by the management controller and via a side band channel, the storage device to gain access to the boot partition, wherein a corrupt recovery image stored in the boot partition is identified while the storage device is selectively powered and other components of the hardware resources are depowered, the corrupt recovery image being unusable during the boot to place the data processing system in the desired operating state.

16. A data processing system, comprising:

a processor; and a memory coupled to the processor to store instructions, which when executed by the processor, cause the processor to perform operations for managing operation of a data processing system, the operations comprising:

identifying, by a management controller of the data processing system, a startup of hardware resources of the data processing system;

identifying, by a management controller of the data processing system, an occurrence of an unrecoverable boot failure for the data processing system during a boot of the data processing system;

based on the identifying:

obtaining, by the management controller and from a remote entity via an out-of-band communication channel, a recovery image, the recovery image being usable to boot the data processing system into a desired operating state;

storing, by the management controller and to a boot partition of a storage device hosted by hardware resources via a side band channel, the recovery image;

initiating, by the processor of the hardware resources and using an in-band channel between the processor and the storage device, a new boot using the recovery image to place the data processing system in the desired operating state; and providing computer-implemented services while the data processing system is in the desired operating state.

17. The data processing system of claim 16, wherein the unrecoverable boot failure is due to all images usable to complete the boot being corrupted.

18. The data processing system of claim 16, wherein the hardware resources comprise the processor, a boot storage device, and the storage device, wherein the hardware resources are connected via at least one in-band channel.

19. The data processing system of claim 18, wherein the at least one in-band channel is used to provide the computer-implemented services.

20. The data processing system of claim 16, further comprising:

prior to the storing of the recovery image:

selectively powering, by the management controller and via a side band channel, the storage device to gain access to the boot partition, wherein a corrupt recovery image stored in the boot partition is identified while the storage device is selectively powered and other components of the hardware resources are depowered, the corrupt recovery image being unusable during the boot to place the data processing system in the desired operating state.

* * * * *